United States Patent
Kim et al.

(10) Patent No.: US 8,335,217 B2
(45) Date of Patent: Dec. 18, 2012

(54) METHOD AND APPARATUS FOR FILTERING MULTICAST PORT IDENTIFIER IN GIGABIT-CAPABLE PASSIVE OPTICAL NETWORK (GPON) SYSTEM

(75) Inventors: Geun Yong Kim, Gyeonggi-do (KR); Hark Yoo, Gwangju (KR); Dongsoo Lee, Gwangju (KR); Sung Chang Kim, Gwangju (KR); Mun Seob Lee, Daejeon (KR); Youngsuk Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 328 days.

(21) Appl. No.: 12/687,238

(22) Filed: Jan. 14, 2010

(65) Prior Publication Data

US 2011/0103382 A1    May 5, 2011

(30) Foreign Application Priority Data

Nov. 4, 2009   (KR) ................ 10-2009-0105930

(51) Int. Cl.
*H04L 12/28* (2006.01)
(52) U.S. Cl. .............. 370/392; 370/252
(58) Field of Classification Search .......... None
See application file for complete search history.

(56) References Cited

U.S. PATENT DOCUMENTS

| | | | | |
|---|---|---|---|---|
| 6,757,266 B1 * | 6/2004 | Hundscheidt | | 370/328 |
| 7,245,621 B2 * | 7/2007 | Sala et al. | | 370/392 |
| 7,286,538 B2 * | 10/2007 | Song et al. | | 370/392 |
| 7,289,501 B2 * | 10/2007 | Davis | | 370/390 |
| 7,480,295 B2 * | 1/2009 | Sung et al. | | 370/390 |
| 7,630,637 B2 * | 12/2009 | Mizutani et al. | | 398/67 |
| 7,636,354 B2 * | 12/2009 | Diouf | | 370/390 |
| 7,924,835 B2 * | 4/2011 | Platnic | | 370/390 |
| 2003/0118051 A1 * | 6/2003 | Ooms | | 370/471 |
| 2006/0126627 A1 | 6/2006 | Diouf | | |
| 2010/0309800 A1 * | 12/2010 | Fahmy | | 370/252 |
| 2011/0103382 A1 * | 5/2011 | Kim et al. | | 370/390 |

FOREIGN PATENT DOCUMENTS

| | | |
|---|---|---|
| KR | 10-0617725 B1 | 8/2006 |
| KR | 10-0826883 B1 | 4/2008 |

* cited by examiner

*Primary Examiner* — Robert Wilson
(74) *Attorney, Agent, or Firm* — Ladas & Parry LLP

(57) ABSTRACT

Provided is an apparatus for filtering a multicast port identifier, the apparatus including: a processor to receive an Internet Group Management Protocol (IGMP) message from a switching unit, to verify a traffic reception request received from a subscriber terminal based on the IGMP message, and to store a value in a filtering register based on the traffic reception request; and an Optical Network Unit (ONU) Media Access Control (MAC) manager to filter a packet to be forwarded to the subscriber terminal, using a port identifier for traffic forwarding and reception with the subscriber terminal, and using the value of the filtering register indicating an existence of traffic to be forwarded to the subscriber terminal.

19 Claims, 8 Drawing Sheets

METHOD AND APPARATUS FOR FILTERING MULTICAST PORT IDENTIFIER IN GIGABIT-CAPABLE PASSIVE OPTICAL NETWORK (GPON) SYSTEM

CROSS-REFERENCE TO RELATED APPLICATION

This application claims the benefit of Korean Patent Application No. 10-2009-0105930,filed on Nov. 4, 2009,in the Korean Intellectual Property Office, the disclosure of which is incorporated herein by reference.

BACKGROUND

1. Field of the Invention

The present invention relates to a method and apparatus for filtering a multicast port identifier, and more particularly, to a method and apparatus for filtering a multicast port identifier for multicast traffic forwarding in a Gigabit-capable Passive Optical Network (GPON) system.

2. Description of the Related Art

A data forwarding scheme in a network may include a unicast forwarding scheme for "one-to-one node forward", a broadcast forwarding scheme for "one-to-all node forward", and a multicast forwarding scheme for a "one-to many node forwarding with respect to particular subscribers. In this instance, the multicast forwarding scheme may need a multicast protocol and a support in a corresponding network, which is different from the unicast forwarding scheme or the broadcast forwarding scheme.

A Passive Optical Network (PON) technology is one of Fiber To The Home (FTTH) technologies proposed to effectively provide a necessary bandwidth for a subscriber end. A PON is in a Point-to-Multipoint network structure where a plurality of Optical Network Units (ONUs) shares a single Optical Line Termination (OLT) using a passive element. An Optical Distribution Network (ODN) is in a tree structure where the OLT and the ONUs are connected to each other.

The PON is in the Point-to-Multipoint structure and thus may be an optimal solution for an Internet Protocol Television (IPTV) broadcasting service that needs broadcasting or multicasting.

A Gigabit-capable Passive Optical Network (GPON) standard defines only a unicast port identifier and a broadcast identifier with respect to a port identifier between an OLT and an ONT. Therefore, in order to forward a multicast packet to the ONT that is a constituent element of a multicast group, a number of packets corresponding to a number of ONTs may be copied, and a port identifier of a corresponding ONT may be attached to each of the packets.

SUMMARY

An aspect of the present invention provides a method and apparatus for filtering a multicast port identifier in a Gigabit-capable Passive Optical Network (GPON) system that may not need to separately manage an allocation and a cancellation of a multicast port identifier in an Optical Line Termination (OLT), and may also decrease a power consumption.

According to an aspect of the present invention, there is provided an apparatus for filtering a multicast port identifier, the apparatus including: a processor to receive an Internet Group Management Protocol (IGMP) message from a switching unit, to verify a traffic reception request received from a subscriber terminal based on the IGMP message, and to store a value in a filtering register based on the traffic reception request; and an Optical Network Unit (ONU) Media Access Control (MAC) manager to filter a packet to be forwarded to the subscriber terminal, using a port identifier for traffic forwarding and reception with the subscriber terminal, and using the value of the filtering register indicating an existence of traffic to be forwarded to the subscriber terminal.

According to another aspect of the present invention, there is provided an apparatus for filtering a multicast port identifier, the apparatus including: a processor to store a value in an ONU MAC register of a GPON Encapsulation Mode (GEM) frame according to a multicast traffic reception request received from a subscriber terminal, and to indicate whether to discard the GEM frame; and an ONU MAC manager to filter the GEM frame based on the value of the ONU MAC register.

According to still another aspect of the present invention, there is provided a method of controlling a processor of a multicast port identifier filtering apparatus including the processor and an ONU MAC manager, the method including: receiving an IGMP message from a subscriber terminal; verifying whether a traffic forwarding to the subscriber terminal is needed, based on the IGMP message; and storing a value in an ONU MAC register based on whether the traffic forwarding to the subscriber terminal is needed.

According to yet another aspect of the present invention, there is provided a method of controlling an ONU MAC manager of a multicast port identifier filtering apparatus including a processor and the ONU MAC manager, the method including: checking a header of a packet to extract a port identifier; and determining whether to discard or forward the packet based on the extracted port identifier and a value of a filtering register.

EFFECT

According to embodiments of the present invention, it is possible to effectively forward multicast traffic within a range specified by International Telecommunication Union Telecommunication Standardization Sector (ITU-T) G-984 recommendations, Working Text (WT)-167 recommendations and Technical Report (TR)-156 of Broadband Forum.

Also, according to embodiments of the present invention, an Optical Line Termination (OLT) and an Optical Network Unit (ONU) may not need a table for mapping a multicast address and a port identifier.

Also, according to embodiments of the present invention, when a subscriber does not receive multicast traffic, it is possible to obtain the effect appearing as though a port identifier is allocated or cancelled with respect to an ONU. It is also possible to decrease a power consumption used for a reassembly process of a downstream frame in the ONU.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
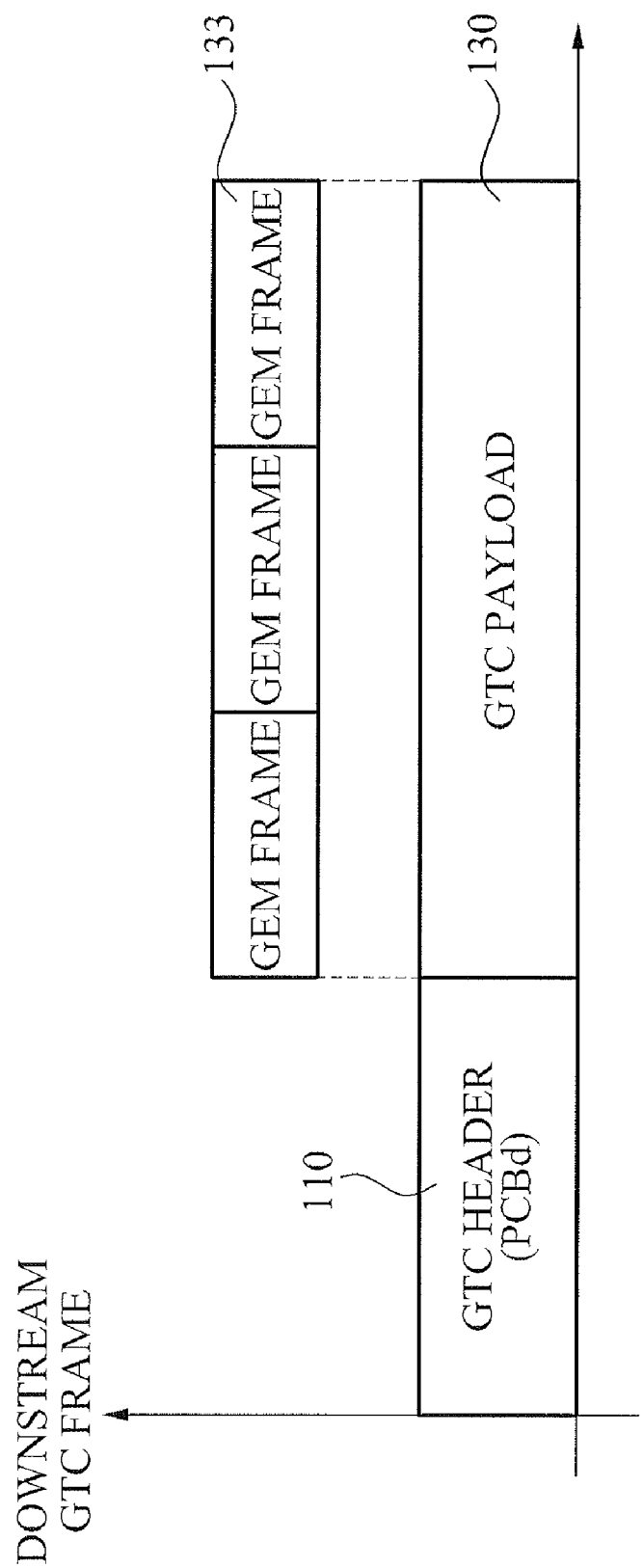
FIG. 1 is a diagram illustrating a configuration of a Gigabit-capable Passive Optical Network Transmission Convergence (GTC) Media Access Control (MAC) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to an embodiment of the present invention, there is a method and apparatus for filtering a multicast port identifier in an Optical Network Unit (ONU). Therefore, in a Gigabit-capable Passive Optical Network (GPON) system, when an Optical Line Termination (OLT) forwards, using the multicast port identifier, multicast traffic to an Optical Network Termination (ONT, hereinafter, unless otherwise mentioned, referred to as "ONU") that is a particular form of the ONU including a single subscriber or a plurality of subscribers, the OLT may identify the multicast port identifier.

FIG. 1 is a diagram illustrating a configuration of a GPON Transmission Convergence (GTC) Media Access Control (MAC) according to an embodiment of the present invention.

Referring to FIG. 1, a GPON system may forward a downstream GTC frame at periods of 125 µs, and forward an upstream GTC frame only at an allocated point in time.

The GTC frame may include a header portion 110 and a payload portion 130. The header portion 110 may include information regarding a Physical Layer Operations, Administration, and Maintenance (PLOAM) message and a bandwidth allocation in association with a registration. The payload portion 130 may include a GPON Encapsulation Mode (GEM) frame 133 of data being actually serviced.

The GEM frame 133 may include a port identifier. Each of ONUs connected to a single OLT may receive the GEM frame 133 using its own port identifier.

Specifically, the OLT may allocate, to an accessing ONU, a port identifier that is needed for forwarding. The OLT may attach the port identifier to downstream data and thereby forward the data. Each of the ONUs may receive only data forwarded to its own allocated port identifier.

Working Text (WT)-167 of Broadband Forum being currently documented discloses requirements regarding multicast traffic forwarding and Quality of Service (QoS) with respect to an ONU system, when a GPON system functions as an aggregation network. To describe a system that satisfies the above requirements, an Ethernet-based GPON aggregation network structure that may include an ONU entity and an Ethernet access node entity defined in Technical Report (TR)-101 will be described with reference to FIG. 2.

Figure 2:
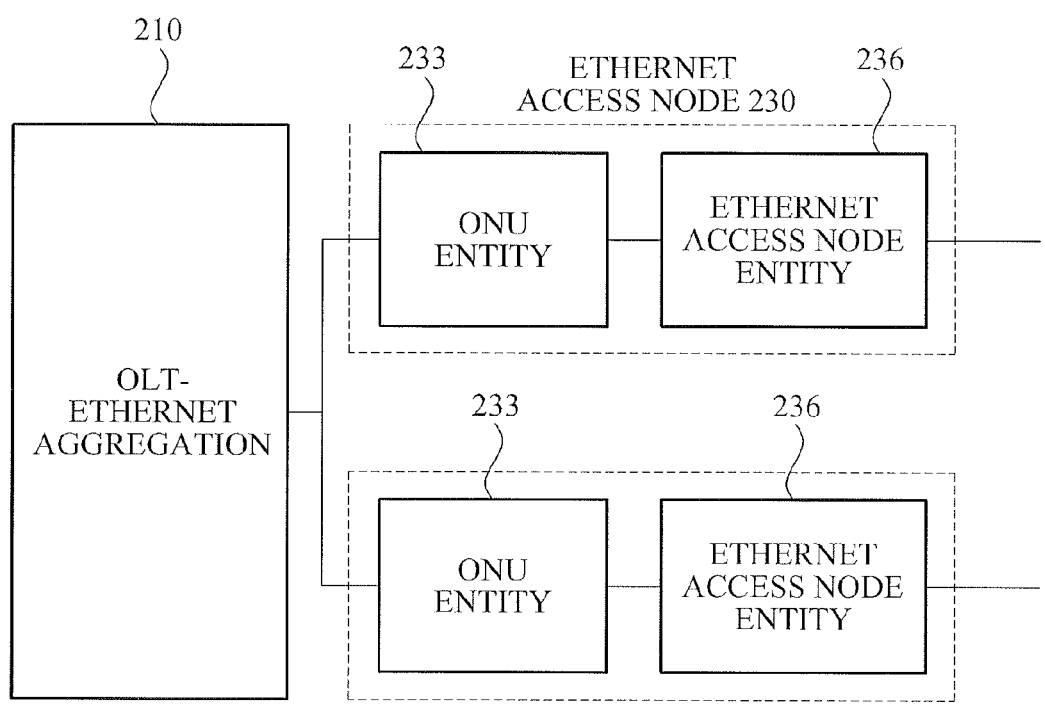
FIG. 2 is a block diagram illustrating a structure of an Ethernet-based GPON aggregation network according to an embodiment of the present invention.

FIG. 2 is a block diagram illustrating a structure of an Ethernet-based GPON aggregation network according to an embodiment of the present invention. Referring to FIG. 2, the Ethernet-based GPON aggregation network may include an OLT-Ethernet aggregation 210, ONU entities 233 of an Ethernet access node 230, and Ethernet access node entities 236 defined in TR-101.

The OLT-Ethernet aggregation 210 corresponds to a termination of a GPON interval, and functions to convert a downstream Ethernet frame to a GTC frame of the GPON interval, and to switch the downstream Ethernet frame to an upstream Ethernet frame.

The ONU entities 233 may be in charge of only forwarding of Ethernet frames in the GPON interval. The Ethernet access node entities 236 may manage switching of a packet to subscribers.

Requirements for a multicast traffic forwarding are specified in International Telecommunication Union Telecommunication Standardization Sector (ITU-T) G.984.4 recommendations, currently under discussion in WT-167 and TR-156 of Broadband Forum. According to the above recommendations, the OLT may use a single port ID to forward multicast traffic to each of the ONUs.

Specifically, since all the traffic reaches the ONUs due to a Point-to-Multipoint GPON structure, each of the ONUs accessing the single OLT may be allocated with a single port identifier to receive the multicast traffic. The OLT may forward the multicast traffic using the port identifier.

A process for the multicast traffic may be performed in Internet Group Management Protocol (IGMP) function blocks of the Ethernet access node entities 236, instead of a GPON area. However, as necessary, even the multicast traffic may be forwarded using a unicast port identifier instead of using a multicast port identifier.

When using the multicast port identifier, the multicast traffic may be forwarded to all the ONUs, without the multicast traffic being encrypted by an advanced encryption standard (AES) encryption scheme, whereby the process for the multicast traffic may be performed in the IGMP function block of the ONU. When using the unicast port identifier, the multicast traffic may be forwarded to only a particular ONU, the multicast traffic being encrypted by the AES encryption scheme.

As specified in ITU-T G.984.3 recommendations, whether an ONU may check a port identifier to thereby determine whether to discard or forward a corresponding packet may correspond to a GEM framing portion. Here, a port identifier may be extracted by checking a header of the GEM frame 133, and whether to discard or forward the corresponding packet may be performed based on the extracted port identifier.

When the extracted port identifier is included in a port identifier list allocated to the ONU, the corresponding packet may go through a reassembly process with respect to an Ethernet frame within the GEM frame in order to be forwarded to a subscriber. Multicast traffic forwarded using a single port identifier may be forwarded to the Ethernet access node entities 236 such as L2/L3 switches through the above process. Here, the IGMP function block functions to forward and filter the multicast traffic.

In the case of IPTV multicast traffic that is forwarded without being encrypted by the AES encryption scheme, the IPTV multicast traffic may be forwarded to all the ONUs. Therefore, regardless of whether the subscriber views a corresponding broadcast, GPON MAC and IGMP function blocks may need to operate, which may result in inefficient power consumption or functions.

In order to avoid the above conditions, a scheme of allocating a different port identifier to each of ONUs or allocating a port identifier to grouped ONUs may be used. In this case, the OLT and the ONUs may need to use a table for cancellation and allocation of the port identifier, and may also need to forward and receive a message for a port identifier allocation.

Therefore, according to an embodiment of the present invention, when forwarding multicast traffic, the OLT may forward the multicast traffic using a single multicast port identifier. In this instance, a GEM frame forwarded using the multicast port identifier may be filtered in an ONU MAC based on a multicast traffic reception request received from a subscriber. The multicast traffic reception request may be recognized from an IGMP join/leave message by the Ethernet access node entities 236 of the ONU.

Figure 3:
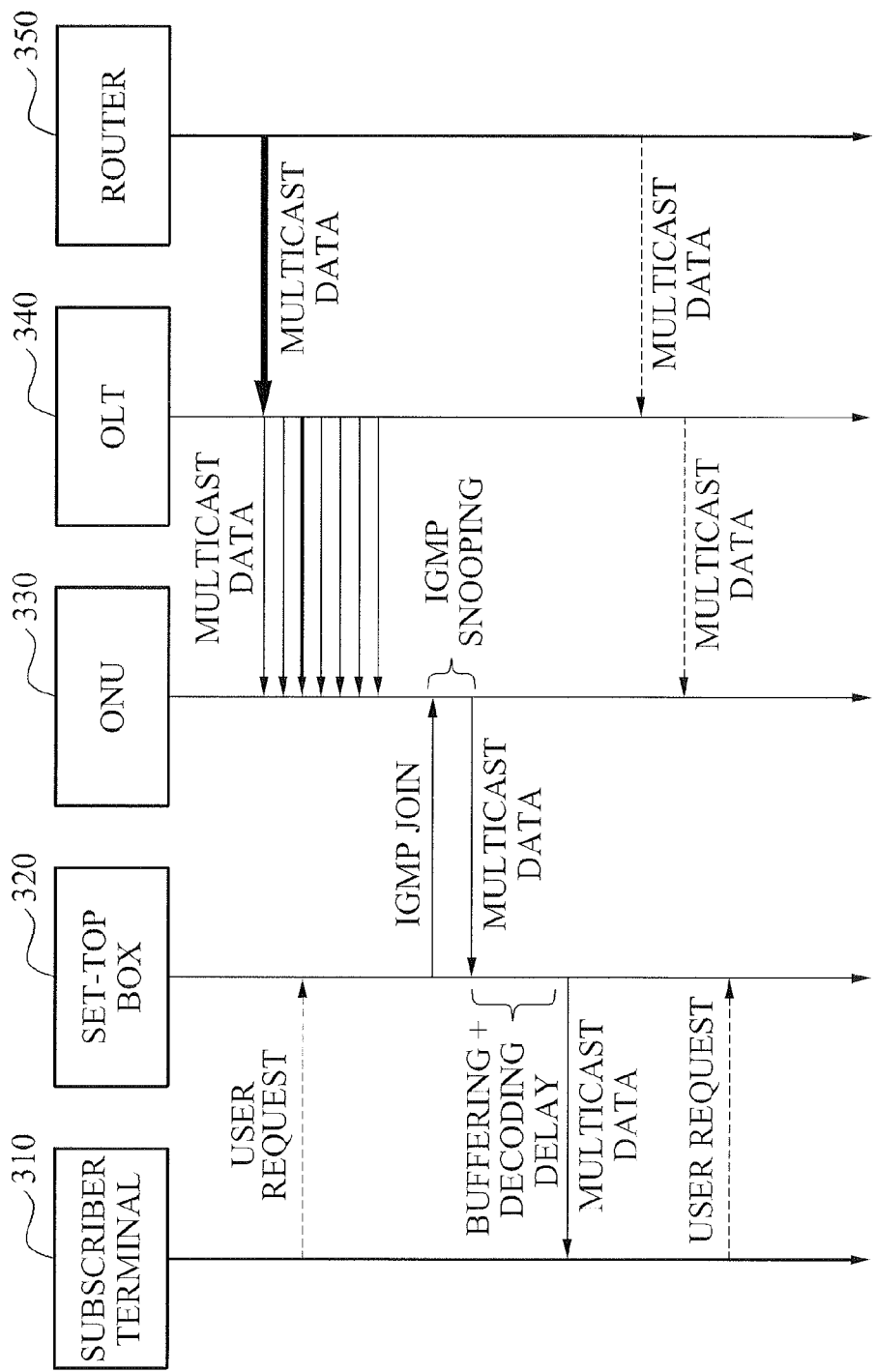
FIG. 3 is a diagram illustrating an Internet Protocol Television (IPTV) broadcast traffic forwarding according to an embodiment of the present invention.

FIG. 3 is a diagram illustrating an IPTV broadcast traffic forwarding according to an embodiment of the present invention. As described above with reference to FIG. 2, the Ethernet access node entity 236 may use an IGMP snooping function for multicast traffic forwarding.

The term "multicast traffic" used throughout the present specification may be used as a meaning that includes multicast data.

Here, the IGMP snooping function denotes a function of snooping, that is, transferring an IGMP query message, an IGMP report message, and an IGMP leave message that are used in an IP group management protocol, that is, an IGMP, when a communication is performed between a multicast router and a multicast host.

It is possible to manage a multicast MAC table of an L2 Ethernet switch using the IGMP snooping function, and to prevent a corresponding packet from being forwarded to another port, instead of being forwarded to a multicast group of the L2 Ethernet switch.

Referring to FIG. 3, when a subscriber terminal 310 requests a reception of a TV channel, a set-top box 320 may forward an IGMP join message to an ONU 330 for multicast traffic reception. In this instance, when the multicast traffic is being received in a port of the subscriber terminal 310 by referring to a multicast forwarding table, a switch may add the port of the subscriber terminal 310 to the multicast forwarding table, and thereby forward the multicast traffic.

When the port of the subscriber terminal 310 is not included in the multicast forwarding table, the IGMP join message of the subscriber terminal 310 may be forwarded to a router 350, for example, an IGMP multicast router, via an OLT 340.

When the subscriber terminal 310 changes a channel, the set-top box 320 may forward an IGMP leave message to the ONU 330. The ONU 330 may delete the port of the subscriber terminal 310 from the multicast forwarding table. The IGMP leave message may be forwarded to the router 350, for example, the IGMP multicast router, via the OLT 340.

When a subscriber turns off the subscriber terminal 310, for example, a TV, the set-top box 320 may not respond to an IGMP query message forwarded from the router 350 or the Ethernet access node entity 236 that performs an IGMP snooping function. Therefore, the port of the corresponding subscriber terminal 310 may be deleted from a multicast traffic forwarding table after a predetermined period of time is elapsed.

The above process may be applicable to both an ONT including a single subscriber and an ONU that includes a plurality of subscribers. Even the ONT including the single subscriber may need to forward corresponding multicast traffic among a plurality of multicast traffic to a corresponding subscriber terminal.

Figure 4:
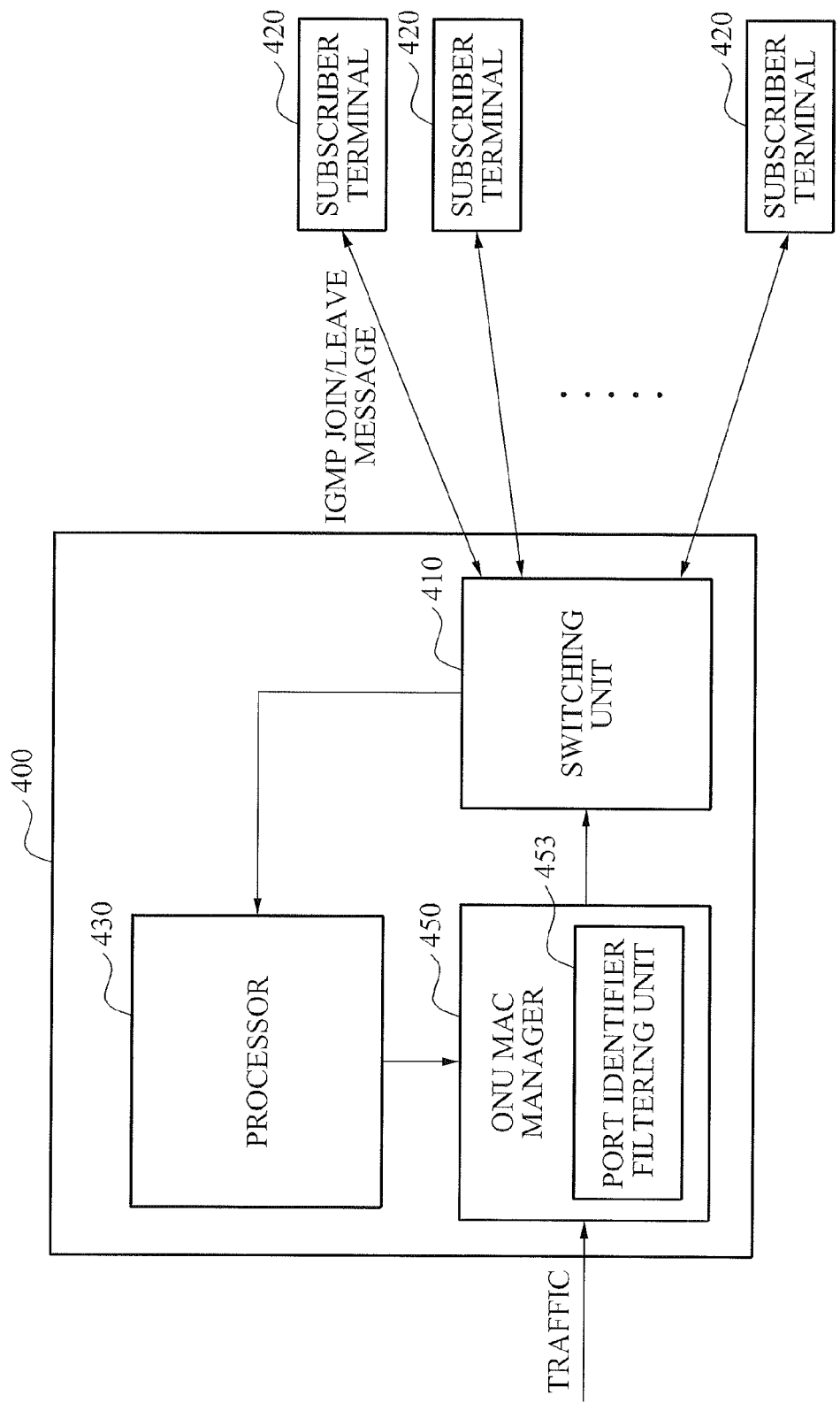
FIG. 4 is a block diagram illustrating a configuration of an apparatus for filtering a multicast port identifier according to an embodiment of the present invention.

FIG. 4 is a block diagram illustrating a configuration of an apparatus 400 for filtering a multicast port identifier according to an embodiment of the present invention. The multicast port identifier filtering apparatus 400 may include a switching unit 410, a processor 430, and an ONU MAC manager 450.

The switching unit 410, for example, an Ethernet access node may receive an IGMP message from a subscriber terminal 420, and may switch a packet to be forwarded to the subscriber terminal 420 in response to a traffic reception request from the subscriber terminal 420.

The IGMP message may include at least one of an IGMP join message for traffic reception, an IGMP leave message for channel change, and an IGMP query message.

The switching unit 410 may use, for example, an L2/L3 switch. The switching unit 410 may verify a value that needs to be stored in a filtering register, using statistical information associated with the IGMP join/leave message verified using the L2/L3 switch, or using a multicast traffic forwarding table of the L2/L3 switch.

For the aforementioned multicast traffic forwarding, the switching unit 410 may include the Ethernet access node entities 236 using an IGMP snooping function.

The processor 430 may store a value in the filtering register using the verified statistical information or using the value of the multicast traffic forwarding table.

The processor 430 may receive, from the switching unit 410, the IGMP message, for example, the IGMP join/leave message of a subscriber port, and may verify a traffic reception request from the subscriber terminal 420 based on the received IGMP message. The processor 430 may obtain information regarding whether to forward the multicast traffic based on the traffic reception request, and may store the value in the filtering register.

For example, when the IMG join message is not forwarded from the subscriber terminal 420 and thus there is no need to forward the multicast traffic, the processor 430 is may store "1" in the filtering register of ONU MAC. Conversely, when the IGMP join message is received from the subscriber terminal 420 and thus there is a need to forward the multicast traffic to the subscriber terminal 420, the processor 430 may store "0" in the filtering register. The value to be stored in the filtering register may be set in advance or be arbitrarily determined.

The ONU MAC manager 450 may integrally manage a multicast port identifier and filtering register, The ONU MAC manager 450 may filter a packet to be forwarded to the subscriber terminal 420 using a port identifier for traffic forwarding/reception with the subscriber terminal 420, and using the value of the filtering register, and thereby determine whether to discard or forward the packet. The value of the filtering register indicates an existence of traffic to be forwarded to the subscriber terminal 420.

For example, when the value of the filtering register is "1", the ONU MAC manager 450 may discard the packet during a GEM framing process regardless of whether the subscriber terminal 420 corresponds to an allocated multicast port identifier. When the value of the filtering register is "0", the ONU MAC manager 450 may verify whether the subscriber terminal 420 corresponds to the allocated multicast port identifier, and thereby determine whether to discard or forward the packet. The above process may be applied to only the multicast port identifier and may not consider the value of the filtering register with respect to other port identifiers.

Even an ONT system including a single subscriber may operate as above. In this case, the IGMP function block may only need to verify whether to forward traffic to the single subscriber.

Also, the ONU MAC manager 450 may check a header of a packet to extract a port identifier, and may check the extracted port identifier to thereby determine whether to discard or forward the packet.

According to an embodiment of the present invention, each of all the ONUs may be allocated with a multicast port identifier for multicast traffic reception. When a multicast forwarding request is not received from a current subscriber, a port identifier filtering unit 453 of the ONU MAC manager 450 may discard a GEM frame.

For this, the ONU MAC manager 450 may check the header of the packet to extract the port identifier, and may determine whether to discard or forward the packet based on the extracted port identifier and the value of the filtering register. Also, the ONU MAC manager 450 may include the port identifier filtering unit 453 that may determine whether to discard or forward the packet based on the extracted port identifier and the value of the filtering register.

As described above, the ONU MAC manager 450 may use a different packet discard scheme based on the value of the filtering register. For example, when the value of the filtering register is "1", the ONU MAC manager 450 may discard the packet during the GEM framing process regardless of whether the subscriber terminal 420 corresponds to the multicast port identifier. When the value of the filtering register is "0", the ONU MAC manager 450 may verify whether the subscriber terminal 420 corresponds to the allocated multicast port identifier, and thereby determine whether to discard or forward the packet.

Only when the port identifier corresponds to the multicast port identifier, may the ONU MAC manager 450 determine whether to discard or forward the packet, for example, a GEM frame based on the value of the filtering register.

Figure 5:
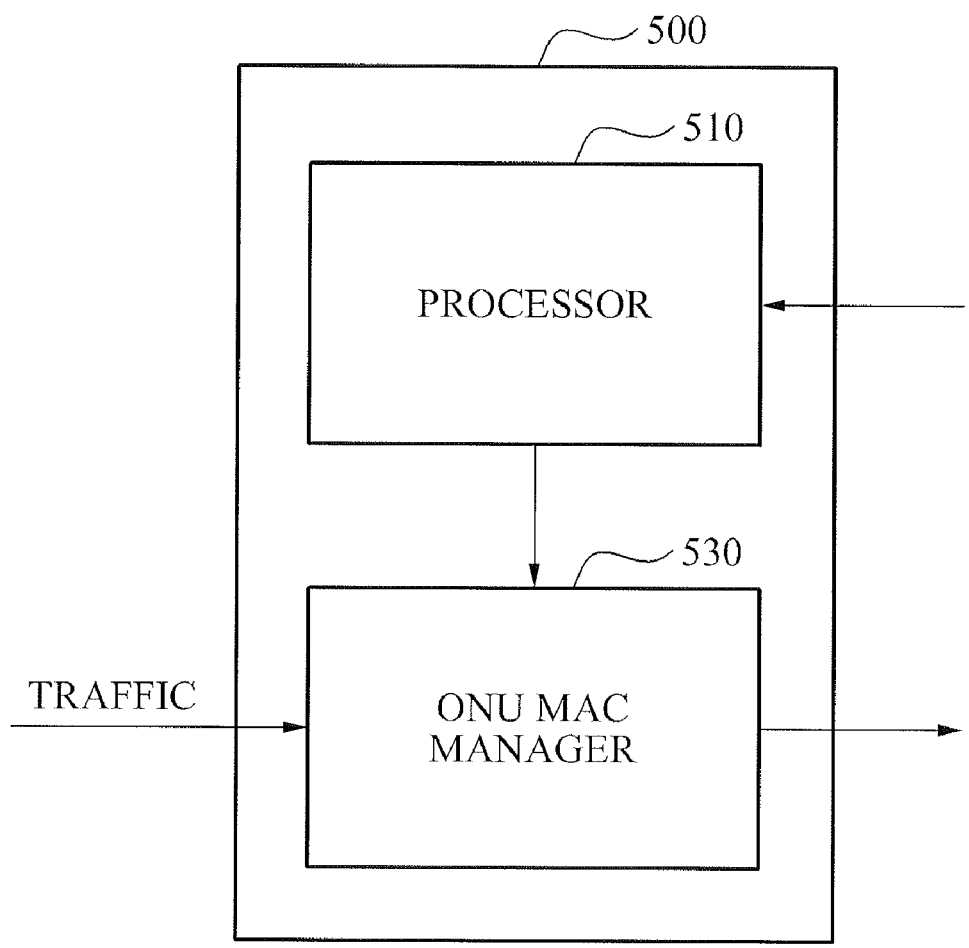
FIG. 5 is a block diagram illustrating a configuration of an apparatus for filtering a multicast port identifier according to another embodiment of the present invention.

FIG. 5 is a block diagram illustrating a configuration of an apparatus 500 for filtering a multicast port identifier according to another embodiment of the present invention. Referring to FIG. 5, the multicast port identifier filtering apparatus 500 may include a processor 510 and an ONU MAC manager 530.

The processor 510 may store a value in an ONU MAC register of a GEM frame according to a multicast traffic reception request from a subscriber terminal (not shown), to thereby indicate whether to discard or forward the GEM frame.

The multicast traffic reception request of the subscriber terminal may be received using the Ethernet access node 230 including the ONU entities 233 and the ONU access node entities 236 of FIG. 2, or using an L2/L3 switch.

Accordingly, the processor 510 may determine a value to be stored in an ONU MAC register of the GEM frame, based on statistical information associated with an IGMP join/leave message verified using the L2/L3 switches or a multicast traffic forwarding table of the L2/L3 switch.

A multicast traffic reception request from the subscriber terminal may be verified based on an IGMP message, for example, the IGMP join/leave message of a subscriber port. The value may be stored in the ONU MAC register of the GEM frame based on information regarding whether to forward multicast traffic to the subscriber terminal.

The ONU MAC manager 530 may filter the received GEM frame based on the value of the ONU MAC register.

The ONU MAC manager 530 may discard the GEM frame based on the value of the ONU MAC register, or may verify whether the subscriber corresponds to the port identifier to thereby determine whether to discard or forward the GEM frame.

When the value of the ONU MAC register is a first value, for example, "1", the ONU MAC manager 530 may discard the GEM regardless of whether the subscriber terminal corresponds to the port identifier. When the value of the ONU MAC register is a second value, for example, "0", the ONU MAC manager 530 may verify whether the subscriber terminal corresponds to the port identifier. When the subscriber terminal does not correspond to the port identifier, the ONU MAC manager may discard the GEM frame.

Figure 6:
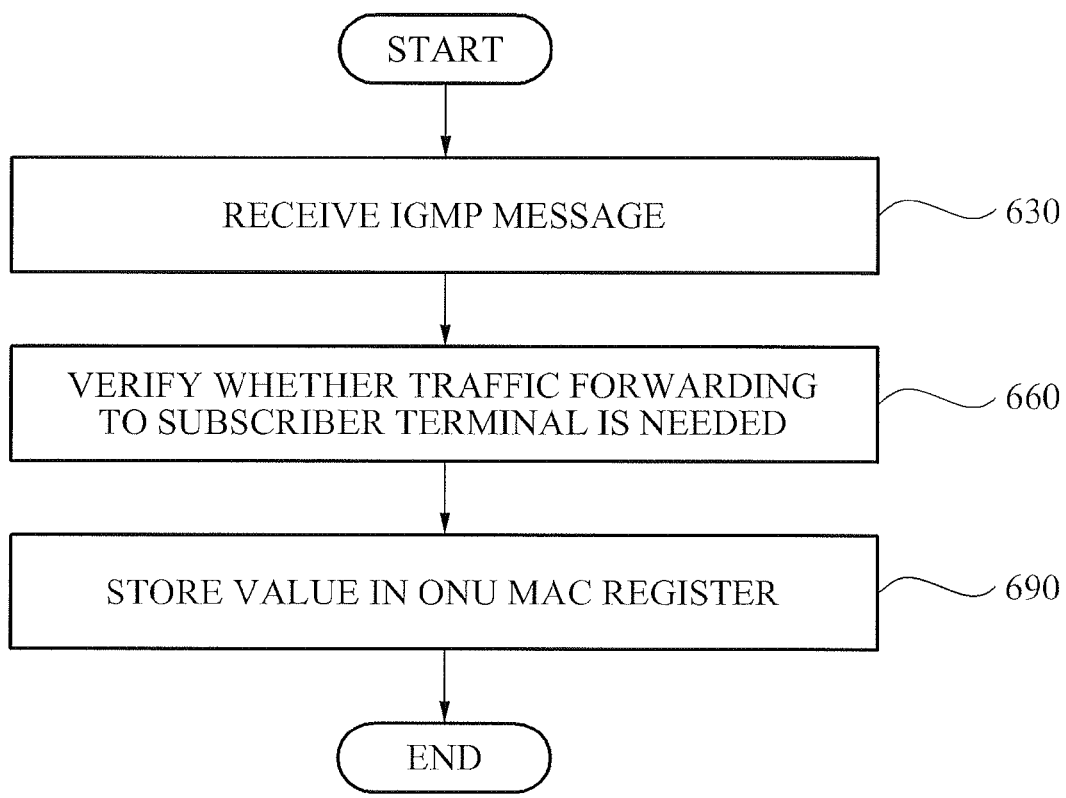
FIG. 6 is a flowchart illustrating a method of controlling a processor of a multicast port identifier filtering apparatus according to an embodiment of the present invention.

FIG. 6 is a flowchart illustrating a method of controlling a processor of a multicast port identifier filtering apparatus according to an embodiment of the present invention.

Referring to FIG. 6, in operation 630, the processor may receive, from a switching unit, an IGMP message with respect to a subscriber terminal.

In operation 660, the processor may verify whether a traffic forwarding to the subscriber terminal is needed, based on the IGMP message. When the IGMP message received from the subscriber terminal is an IGMP join message, the processor may verify that a traffic forwarding request is received from the subscriber terminal. When the IGMP message is an IGMP leave message, the processor may verify that the traffic forwarding to the subscriber terminal is not needed.

When whether the traffic forwarding to the subscriber terminal is needed is verified based on the IGMP message, the processor may store a value in an ONU MAC register in operation 690.

For example, when the IGMP join message is not forwarded from subscriber terminals and thus the traffic forwarding is not needed, the processor may store "1" in the ONU MAC register. When the IGMP join message is received from the subscriber terminals and thus the traffic forwarding is needed, the processor may store "0" in the ONU MAC register.

When the value is stored in the ONU MAC register in operation 690, the value of the ONU MAC register may be stored using other information in addition to the IGMP message. For example, when an L2/L3 switch is used for a switching unit, the value of the ONU MAC register may be determined based on statistical information associated with the IGMP join/leave message verified using the L2/L3 switch or a traffic forwarding table of the L2/L3 table.

The value of the ONU MAC register may be stored using whether to forward the traffic to the subscriber terminal, which is verified from the IGMP join/leave message, and using a combination result of the statistical information.

Figure 7:
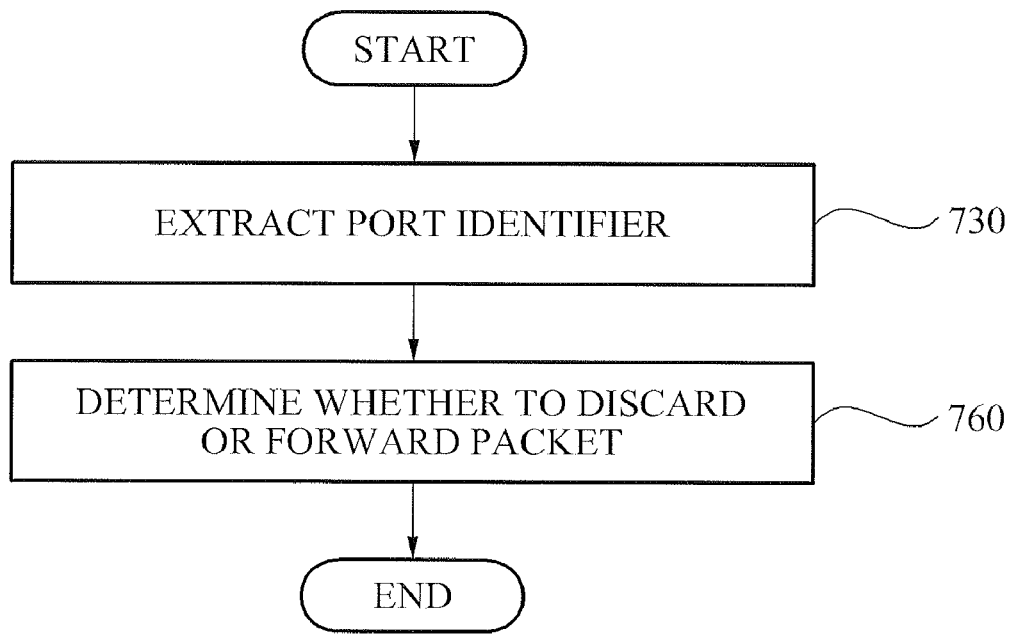
FIG. 7 is a flowchart illustrating a method of controlling an ONU MAC manager of a multicast port identifier filtering apparatus according to an embodiment of the present invention.

FIG. 7 is a flowchart illustrating a method of controlling an ONU MAC manager of a multicast port identifier filtering apparatus according to an embodiment of the present invention.

Referring to FIG. 7, in operation 730, the ONU MAC manager may check a header of a packet, for example, a GEM frame to extract a port identifier.

In operation 760, the ONU MAC manager may determine whether to discard or forward the packet. In this instance, the ONU MAC manager may determine whether to discard or forward the packet using the extracted port identifier and using a value of an ONU MAC register.

To perform operation 760, whether a subscriber terminal corresponds to the extracted port identifier may be verified. The packet may be discarded based on the value of the ONU MAC register, regardless of whether the subscriber terminal corresponds to the extracted port identifier. Also, whether to discard or forward the packet may be determined by verifying whether the subscriber terminal corresponds to the port identifier.

Whether to discard or forward the packet may be determined using the value of the ONU MAC register, only when the extracted port identifier corresponds to a multicast port identifier.

Figure 8:
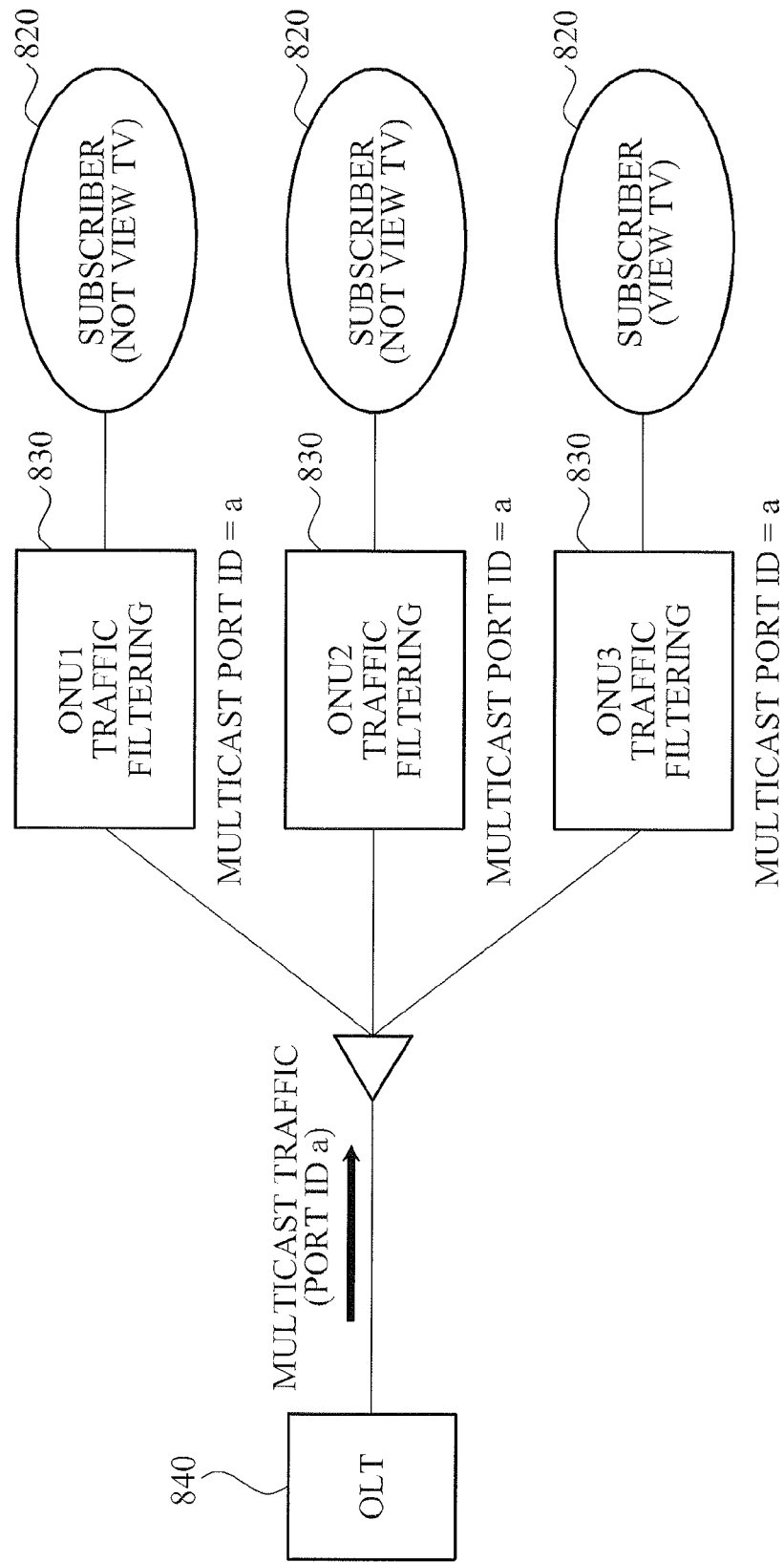
FIG. 8 is a diagram illustrating an IPTV multicast traffic forwarding according to an embodiment of the present invention.

FIG. 8 is a diagram illustrating an IPTV multicast traffic forwarding according to an embodiment of the present invention. Referring to FIG. 8, an OLT 840 may allocate a multicast port identifier to each of ONUs (ONU1, ONU2, ONU3) 830 in order to forward IPTV multicast traffic. The IPTV multicast traffic may be forwarded to all the ONUs (ONU1, ONU2, ONU3) 830, whereas subscribers belonging to the ONUs (ONU1 and ONU2) 830 may not view a TV. Therefore, although the multicast port identifier is allocated, the IPTV multicast traffic may not be forwarded to the corresponding subscribers. The ONU (ONU3) 830 where the subscriber is viewing the TV may forward the IPTV multicast traffic to the corresponding subscriber.

Accordingly, the ONUs (ONU1 and ONU2) 830 that may not forward multicast traffic to their subscribers may not go through an Ethernet packet reassembly process and may not perform an IGMP function. Also, the OLT 840 may not need to separately manage allocation and cancellation of the multicast port ID.

The method of controlling the processor and the ONU MAC manager included in the multicast port identifier filtering apparatus described above with reference to FIGS. 6 and 7 may refer to like elements, like terms, and like reference numerals described above with reference to FIGS. 1 through 5.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for filtering a multicast port identifier, the apparatus comprising:
a processor to receive an Internet Group Management Protocol (IGMP) message from a switching unit, to verify a traffic reception request received from a subscriber terminal based on the IGMP message, and to store a value in a filtering register based on the traffic reception request; and
an Optical Network Unit (ONU) Media Access Control (MAC) manager to filter a packet to be forwarded to the subscriber terminal, using a port identifier for traffic forwarding and reception with the subscriber terminal, and using the value of the filtering register indicating an existence of traffic to be forwarded to the subscriber terminal.

2. The apparatus of claim 1, wherein the switching unit receives the IGMP message from the subscriber terminal, and switches the packet to be forwarded to the subscriber terminal in response to the traffic reception request of the subscriber terminal.

3. The apparatus of claim 1, wherein:
the switching unit gathers statistical information associated with the IGMP message, and
the processor stores the value in the filtering register based on the statistical information.

4. The apparatus of claim 1, wherein:
the switching unit includes a multicast traffic forwarding table, and
the processor stores the value in the filtering register using a value of the multicast traffic forwarding table.

5. The apparatus of claim 1, wherein the processor verifies a traffic forwarding request of the subscriber terminal based on the IGMP message, and stores the value in the filtering register.

6. The apparatus of claim 1, wherein the ONU MAC manager checks a header of the packet to extract the port identifier, and checks the extracted port identifier to determine whether to discard or forward the packet.

7. The apparatus of claim 1, wherein the ONU MAC manager checks a header of the packet to extract the port identifier, and determines whether to discard or forward the packet based on the extracted port identifier or the value of the filtering register.

8. The apparatus of claim 1, wherein the ONU MAC manager either discards the packet based on the value of the filtering register regardless of whether the subscriber terminal corresponds to the port identifier, or verifies whether the subscriber terminal corresponds to the port identifier to thereby determine whether to discard or forward the packet.

9. The apparatus of claim 1, wherein, when the port identifier corresponds to the multicast port identifier, the ONU MAC manager determines whether to discard or forward the packet based on the value of the filtering register.

10. The apparatus of claim 1, wherein the IGMP message includes at least one of an IGMP join message for traffic reception, an IGMP leave message for a channel change, and an IGMP query message.

11. An apparatus for filtering a multicast port identifier, the apparatus comprising:
a processor to store a value in an ONU MAC register of a GPON Encapsulation Mode (GEM) frame according to a multicast traffic reception request received from a subscriber terminal, and to indicate whether to discard the GEM frame; and
an ONU MAC manager to filter the GEM frame based on the value of the ONU MAC register,
wherein the ONU MAC manager either discards the GEM frame based on the value of the ONU MAC register, or verifies whether the subscriber terminal corresponds to the port identifier to thereby determine whether to discard the GEM frame.

12. The apparatus of claim 11, wherein:
   when the value of the ONU MAC register corresponds to a first value, the ONU MAC manager discards the GEM frame regardless of whether the subscriber terminal corresponds to the port identifier, and
   when the value of the ONU MAC register corresponds to a second value, the ONU MAC manager verifies whether the subscriber terminal corresponds to the port identifier, and when the subscriber terminal does not corresponds to the port identifier, the ONU MAC manager discards the GEM frame.

13. A method of filtering subscriber terminal traffic, the method comprising:
   receiving an Internet Group Management Protocol (IGMP) message from the subscriber terminal;
   verifying whether traffic forwarding to the subscriber terminal is required based on the IGMP message; and
   when traffic forwarding to the subscriber terminal is required, then storing a value in an Optical Network Media (ONU) Media Access Control (MAC) register wherein a ONU MAC Manager uses the value stored in the ONU register to determine whether to discard GPON Encapsulation Mode (GEM) frames by filtering or to forward the GEM frames to the subscriber terminal.

14. The method of claim 13, wherein the verifying comprises verifying that a traffic forwarding request is received from the subscriber terminal when the IGMP message corresponds to an IGMP join message.

15. The method of claim 13, wherein the storing comprises storing a first value in the ONU MAC register when the traffic forwarding to the subscriber terminal is needed, and storing a second value in the ONU MAC register when the traffic forwarding to the subscriber terminal is not needed.

16. The method of claim 13, wherein:
   the storing further comprises receiving, from a switching unit, statistical information associated with the IGMP message, and
   the value is stored in the ONU MAC register based on whether the traffic forwarding to the subscriber is needed and a combination of the statistical information.

17. A method of filtering GPON Encapsulation Mode (GEM) frames, the method comprising:
   checking a header of a packet to extract a port identifier and verifying whether to discard or forward a packet based on a combination of the extracted port identifier stored in the header, and
   when traffic forwarding is required, then storing a value in an Optical Network Unit (ONU) Media Access Control (MAC) register wherein a filtering register uses the value to determine whether to discard FPON Encapsulation Mode (GEM) frame by filtering or to forward the GEM frame.

18. The method of claim 17, wherein the determining comprises:
   verifying whether the extracted port identifier corresponds to the subscriber terminal; and
   either discarding the packet based on the value of the filtering register regardless of whether the subscriber corresponds to the extracted port identifier, or verifying whether the subscriber terminal corresponds to the port identifier to thereby determine whether to discard or forward the packet.

19. The method of claim 17, wherein the determining comprises determining whether to discard or forward the packet based on the value of the filtering register, when the port identifier corresponds to the multicast port identifier.

\* \* \* \* \*